(12) United States Patent
Mancoridis et al.

(10) Patent No.: US 8,949,674 B2
(45) Date of Patent: Feb. 3, 2015

(54) DETECTION, DIAGNOSIS, AND MITIGATION OF SOFTWARE FAULTS

(75) Inventors: Spiros Mancoridis, Philadelphia, PA (US); Chris Rorres, Wynnewood, PA (US); Maxim Shevertalov, Phoenixville, PA (US); Kevin M. Lynch, Mount Laurel, NJ (US); Edward Stehle, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 364 days.

(21) Appl. No.: 13/575,196

(22) PCT Filed: Jan. 28, 2011

(86) PCT No.: PCT/US2011/022846
§ 371 (c)(1),
(2), (4) Date: Nov. 14, 2012

(87) PCT Pub. No.: WO2011/094484
PCT Pub. Date: Aug. 4, 2011

(65) Prior Publication Data
US 2013/0198565 A1 Aug. 1, 2013

Related U.S. Application Data

(60) Provisional application No. 61/299,148, filed on Jan. 28, 2010.

(51) Int. Cl.
*G06F 11/32* (2006.01)
*G06F 21/52* (2013.01)
(Continued)

(52) U.S. Cl.
CPC ............ *G06F 11/079* (2013.01); *G06F 11/008* (2013.01); *G06F 11/0793* (2013.01); *G06F 11/3612* (2013.01); *G06F 21/554* (2013.01); *G06N 5/02* (2013.01)
USPC .............. 714/38.1; 714/26; 714/37; 717/124; 717/126; 726/22

(58) Field of Classification Search
USPC ......... 714/25, 26, 33, 37, 38.1; 717/124, 125, 717/126, 132; 726/22, 23, 24
See application file for complete search history.

(56) References Cited

U.S. PATENT DOCUMENTS 5,243,607 A * 9/1993 Masson et al. ................... 714/49
5,862,381 A * 1/1999 Advani et al. ................. 717/125
(Continued)

OTHER PUBLICATIONS

Multivariate Fault Detection with convex Hull by Min Luo published in Digital Avionics Systems Conference, 2004.*
(Continued)

*Primary Examiner* — Joseph Schell
(74) *Attorney, Agent, or Firm* — Baker & Hostetler LLP

(57) ABSTRACT

A computational geometry technique is utilized to detect, diagnose, and/or mitigate fault detection during the execution of a software application. Runtime measurements are collected and processed to generate a geometric enclosure that represents the normal, non-failing, operating space of the application being monitored. When collected runtime measurements are classified as being inside or on the perimeter of the geometric enclosure, the application is considered to be in a normal, non-failing, state. When collected runtime measurements are classified as being outside of the geometric enclosure, the application is considered to be in an anomalous, failing, state. In an example embodiment, the geometric enclosure is a convex hull generated in N-dimensional Euclidean space. Appropriate action (e.g., restart the software, turn off access to a network port) can be taken depending on where the measurement values lie in the space.

20 Claims, 15 Drawing Sheets

(51) Int. Cl.
*G06F 11/07* (2006.01)
*G06F 11/00* (2006.01)
*G06F 11/36* (2006.01)
*G06F 21/55* (2013.01)
*G06N 5/02* (2006.01)

(56) References Cited

U.S. PATENT DOCUMENTS

| | | | |
|---|---|---|---|
| 7,096,459 | B2 | 8/2006 | Keller et al. |
| 7,260,743 | B2 | 8/2007 | Fellenstein et al. |
| 7,448,020 | B2 | 11/2008 | Kohno |
| 7,505,872 | B2 | 3/2009 | Keller et al. |
| 7,539,904 | B2 | 5/2009 | Lau et al. |
| 7,770,080 | B2* | 8/2010 | Blanton et al. ............... 714/723 |
| 8,544,087 | B1* | 9/2013 | Eskin et al. ............... 726/22 |
| 2005/0010388 | A1 | 1/2005 | Bagchi et al. |
| 2005/0125772 | A1 | 6/2005 | Kohno |
| 2005/0188285 | A1 | 8/2005 | Fellenstein et al. |
| 2006/0173857 | A1 | 8/2006 | Jackson |
| 2007/0053252 | A1 | 3/2007 | Gangadhar |
| 2007/0168751 | A1 | 7/2007 | Lau et al. |
| 2007/0288507 | A1 | 12/2007 | Strassner et al. |
| 2008/0133982 | A1* | 6/2008 | Rawlins et al. ............... 714/699 |
| 2008/0195413 | A1 | 8/2008 | Franke et al. |
| 2008/0221858 | A1 | 9/2008 | Bagchi et al. |
| 2008/0250265 | A1 | 10/2008 | Chang et al. |
| 2008/0255819 | A1 | 10/2008 | Gross et al. |
| 2009/0043761 | A1 | 2/2009 | Kohno |
| 2009/0113255 | A1 | 4/2009 | Reilly |
| 2010/0180344 | A1* | 7/2010 | Malyshev et al. ............... 726/23 |

OTHER PUBLICATIONS

International Patent Application No. PCT/US2011/022846: International Search Report and Written Opinion dated Mar. 25, 2011, 7 pages.

* cited by examiner $$t = \begin{bmatrix} m_{1,1} & m_{2,1} & \cdots & m_{k,1} \\ m_{1,2} & m_{2,2} & \cdots & m_{k,2} \\ \vdots & \vdots & \cdots & \vdots \\ m_{1,l} & m_{2,l} & \cdots & m_{k,l} \end{bmatrix}$$

FIGURE 5

| Day | Number of Requests | Convex Hull False Positive Rate | Hyper-rectangle False Positive Rate |
|---|---|---|---|
| Sunday | 33,285 | 3.1% | 2.39% |
| Monday | 42,594 | 3.6% | 2.79% |
| Tuesday | 50,638 | 17.5% | 2.70% |
| Wednesday | 49,782 | 11.2% | 2.90% |
| Thursday | 44,544 | 19.0% | 4.97% |
| Friday | 29,718 | 47.0% | 2.77% |
| Saturday | 15,072 | 99.7% | 2.27% |

FIGURE 10

| Number of Days | Convex Hull | | | Hyper-rectangle | | |
|---|---|---|---|---|---|---|
| | False Positive Rate | False Trigger Rate | False Trigger Periods | False Positive Rate | False Trigger Rate | False Trigger Periods |
| 1 | 99.70% | 99.62% | 1 | 7.27% | 4.94% | 12 |
| 2 | 31.71% | 28.50% | 15 | 2.90% | 2.46% | 8 |
| 3 | 10.73% | 8.50% | 12 | 2.77% | 2.40% | 6 |
| 4 | 3.13% | 2.59% | 8 | 2.75% | 2.40% | 6 |
| 5 | 2.90% | 2.47% | 6 | 2.68% | 2.38% | 5 |
| 6 | 2.84% | 2.45% | 6 | 2.68% | 2.38% | 5 |
| 7 | 2.58% | 2.32% | 3 | 2.35% | 2.28% | 1 |

FIGURE 11

| Faults | Average Convex Hull Detection Time (sec) | Average Hyper-Rectangle Detection Time (sec) |
|---|---|---|
| Slow Infinite Recursion | 27.4 | 25.6 |
| Log Explosion | 26.6 | 28.4 |
| DOS Attack | 45.0 | 46.4 |
| Infinite Loop | 15.4 | 26.0 |
| Fast Memory Leak | 53.2 | 218.2 |
| Slow Infinite Loop | 13.2 | No Detection |
| Infinite Recursion | 26.0 | No Detection |
| Spambot | 59.2 | No Detection |

FIGURE 13

DETECTION, DIAGNOSIS, AND MITIGATION OF SOFTWARE FAULTS

CROSS-REFERENCE TO RELATED APPLICATIONS

This application is the National Stage of International Application No. PCT/US2011/022846, filed Jan. 28, 2011, which claims the benefit of U.S. Provisional Application No. 61/299,148, filed Jan. 28, 2010, the disclosures of which are incorporated herein by reference in their entireties.

TECHNICAL FIELD

The technical field is generally related to detection, diagnosis, and mitigation of software faults, and more specifically related to a computational geometry technique to detect, diagnose, and mitigate software faults.

BACKGROUND

Complex software systems are commonplace in modern organizations and are considered critical to daily operations. These systems are expected to run on a diverse set of platforms while interoperating with a wide variety of other applications and servers. As complex as these systems are, they are still susceptible to software faults. Faults in such heavily depended upon, complex systems, can be costly. Software faults still regularly cause system downtime. Downtime of critical applications can create additional work, cause delays, and lead to financial loss. Faults are difficult to detect before an executing system reaches a point of failure, as the first symptom of a fault is often system failure itself. While it is unrealistic to expect software to be fault-free, actions such as resetting the software, quarantining specific software features, or logging the software's state prior to the failure for later analysis can be taken.

Malicious software (malware) also is a concern to users and/or administrators of complex software systems. Distributed software systems are particularly vulnerable to worms, which are a special type of malware. Worms use a network to propagate and self-replicate, like viruses, but do not need human intervention to initiate the replication process. As a result, worms can spread uncontrollably and rapidly too many computer systems on the same network. For example, a worm can spread by exploiting a security vulnerability, such as a buffer overflow, in a service. Worms can immediately perform harm to a computer system by, for example, erasing contents from the system's hard drive, and may also alter the state of the computer system so that it becomes vulnerable to a future attack. One way to alter the state of a system is via the creation of a back door. Back doors create a secret access channel that is used to interact with (e.g., connect, control, spy) a victim's system. Another way to alter the state of the system is to convert it into a zombie computer known as a bot. The operator of a network of bots (botnet) can send out a worm to infect users with a malicious bot. The bot on the infected computer can log onto a server, such as an Internet Relay Chat (IRC) server for example, which acts as the malicious command and control center for the botnet. Anti-virus programs (e.g., SYMANTEC and MCAFEE) search for worms by scanning for signatures in the binary code of each program's executable file on a computer system. A signature is a unique sequence of code that is found in a malware's executable file. The anti-virus program maintains a frequently updated database of known virus signatures. Unfortunately, scanning executable files for malware signatures is an imperfect solution because of polymorphic and metamorphic malware, which encrypt and mutate the code of a worm every time they are replicated, thus making it impossible for signature-based anti-virus programs to identify them.

SUMMARY

A computational geometry technique is utilized to timely detect, diagnose, and mitigate faults during the execution of a software application. This technique provides the ability to self-diagnose potential failures due to faults or security attacks; and to self-mitigate the effects of these potential failures at run time. The technical approach is based on a set of metrics that are computed using data obtained by software sensors that monitor the status of each service at run time. These metrics are used to determine whether a service is operating as expected or is deviating from its expected operation. Services whose metric values deviate significantly from their expected values are diagnosed as potentially failing. These services may then be subjected to mitigation actions that can either attempt to avoid a failure or collect data to facilitate a postmortem forensic analysis. The technique involves collecting a variety of runtime measurements and utilizing the measurement to generate a geometric enclosure that represents the normal (i.e., non-failing) operating space of the application being monitored. When collected runtime measurements are classified as being outside of the geometric enclosure, the application is considered to be in an anomalous (i.e., failing) state.

In an example process for detecting a software fault, a first runtime metric (or metrics) of software is measured. The first runtime metric (or metrics) can be any appropriate metric(s) gathered during a learning phase of the process in which a geometric enclosure is formulated. The geometric enclosure then is constructed in an operating space, based on the first runtime metric (or metrics). A second runtime metric (or metrics) of the software is measured. The second metric can be any appropriate metric value gathered during a deployment phase of the process, in which values outside of the geometric enclosure are considered anomalous and values inside of the enclosure are considered not anomalous (normal). The types of metrics (e.g., CPU usage, memory usage) gathered during the learning and deployment phases may be the same, but their respective values may differ. Thus, in accordance with the process, the second runtime metric(s) is placed in the operating space, and it is determined that the software is in normal operating state when the second runtime metric(s) is located within or on a perimeter of the geometric enclosure. And, it is determined that the software is in an abnormal operating state when the second runtime metric(s) is located outside of the geometric enclosure.

BRIEF DESCRIPTION OF THE DRAWINGS

FIG. 5 is an illustration of characterizing service behavior via the time series approach.

FIG. 10 illustrates the false-positive results for enclosures constructed from seven individual twenty-four hour segments taken from one week of server traffic.

FIG. 11 illustrates the false-positive results for multiple consecutive day training sets.

FIG. 13 illustrates an example summarized results of Aniketos.

DETAILED DESCRIPTION OF ILLUSTRATIVE EMBODIMENTS

Figure 1:
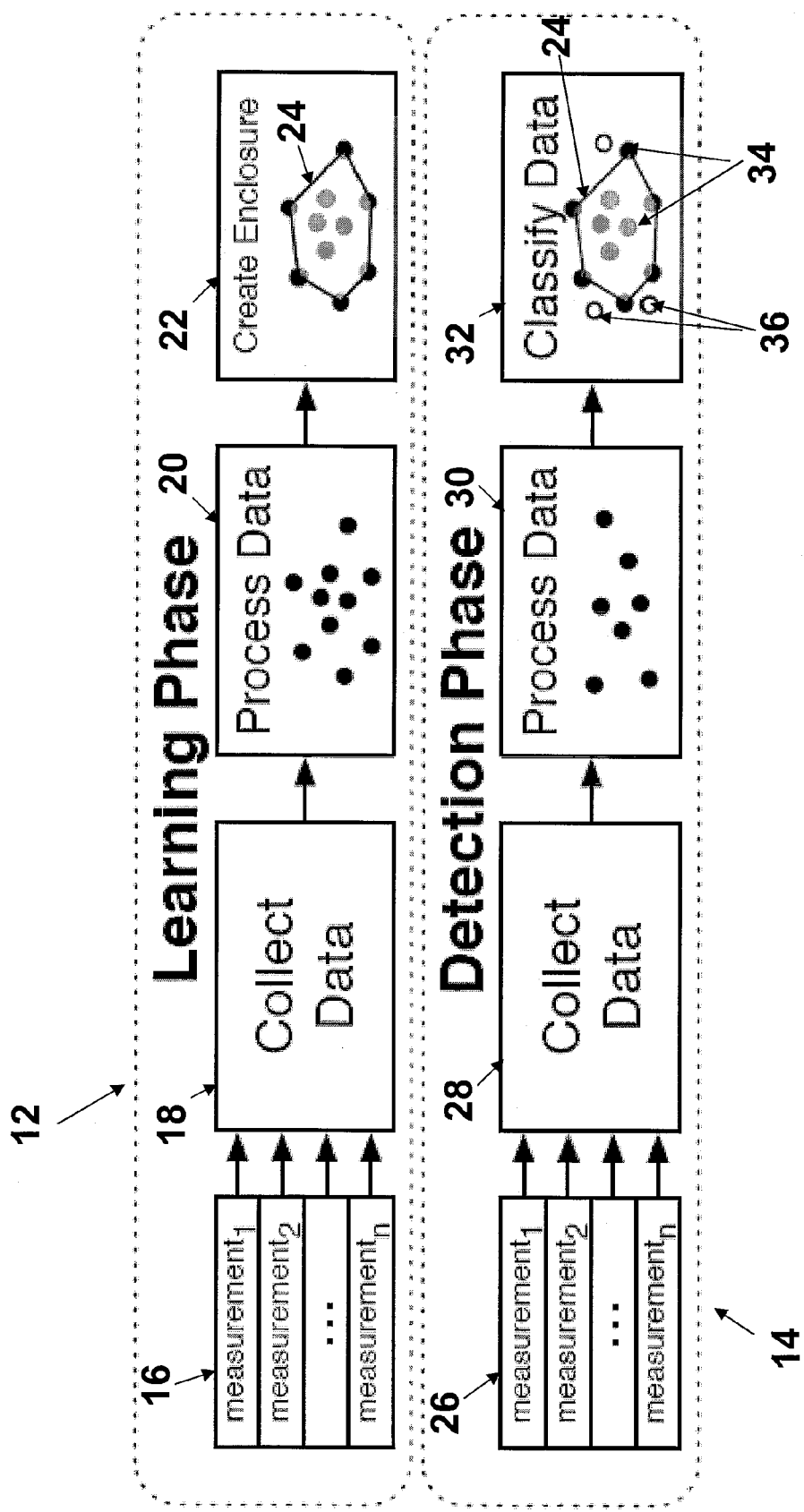
FIG. 1 depicts an example process for detecting, diagnosing, and/or mitigation software faults utilizing an anomaly based computational geometry technique.

Approaches to the detection of software faults can fall into two categories: signature-based and anomaly-based. Signature based techniques detect faults by matching measurements to known fault signatures. Signature based techniques typically are used in static fault-checking software such as commercial antivirus software (e.g., MCAFEE and SYMANTEC), as well as network intrusion detection systems (e.g., SNORT and NETSTAT). Signature based techniques also can be used to detect recurring runtime faults. If a set of known faults exists, then training a system to recognize these faults will typically lead to better fault detection. However, that system is unlikely to recognize faults it has not seen before. For example, a fault caused by a zero-day virus is unlikely to be detected by commercial antivirus software because there are no known patterns to recognize.

Anomaly-based techniques learn to recognize the normal runtime behavior of the monitored system and classify anomalous behavior as potentially faulty. Anomaly-based techniques can detect previously unseen faults. However, anomaly-based techniques risk incorrectly treating any newly encountered good state as faulty. This can occur if insufficient training data were supplied. Typically, anomaly detection techniques begin by collecting sensor measurements of a normally behaving system. Then, they construct a representation of the monitored system and compare any future measurements against that representation. A first approach assumes that all metrics are independent and determines the safe operating range for each of them. During the learning phase, this approach will record the maximum and minimum safe values of each metric and then classify the system as faulty when any of the measurements fall outside of the interval determined by these values. While this approach is capable of detecting some faults, it can fail when the assumption that the metrics are independent is incorrect. A more sophisticated fault detection technique assumes that there are relationships between metrics.

As described herein, a novel anomaly-based computational geometry technique for detecting, diagnosing, and/or mitigating software faults can detect faults it has not seen before. This technique uses computational geometry to (a) detect potential software failures and (b) automatically activate suitable mitigations to avoid software failure. Values of software sensors are embedded in N-dimensional Eucledian space, these points in the N-dimensional Eucledian space are used to compute a geometric enclosure such as a Convex Hull (or an approximation of a Convex Hull such as an Hype-Ellipse, Hype-Rectangle), a sphere, an ellipsoid, or the like. This computational geometry technique is described utilizing a Convex Hull, but it is to be understood that the geometric enclosure is not limited thereto. The geometric enclosure (e.g., Convex Hull) respresents software states that do not result in anomalous behaviors. Any points in N-dimensional Eucledian space that lie outside of the Convex Hull are considered as possibly anomalous states. In an example embodiment, the Eucledian space that lies outside of the Convex Hull is partitioned according to which mitigation results in the best corrective actions. This computational geometry technique does not use statistical machine learning. Rather, this computational geometry technique takes a novel approach that uses computational geometry and works well independent of whether the metrics are correlated or not. This technique is referred to herein as Aniketos. Aniketos was an Olympian god. He was the son of Heracles, and he protected the gates of Mount Olympus from attack.

To summarize, in an example embodiment, Aniketos automatically creates a Convex Hull in N-dimensional Eucledian space. If the software sensors, once embedded in the Eucledian space, lie within the Convex Hull, Aniketos assumes that the software is in a non-failing state. If however, the sensor values lie outside of the Convex Hull, Aniketos will apply a suitable mitigation (e.g., restart the software, turn off access to a network port) depending on where the sensor values lie in the space. Furthermore, the space outside of the Convex Hull can be partitioned, possibly using other Convex Hulls, such that Aniketos will know exactly which mitigation technique or course of action to apply under various possible failing software circumstances. Thus, Aniketos facilitates the continuous monitoring of executing software, the detection of anomalous conditions that may lead to the failure of the software (possibly due to a fault in the software code or to a security attack), and the timely automatic application of one or more mitigations that can recover the software back to a non-failing state.

FIG. 1 depicts an example process for detecting, diagnosing, and/or mitigation software faults utilizing an anomaly based computational geometry technique. During the learning phase 12 Aniketos measures (step 16), collects (step 18), and processes (step 20) runtime measurements, such as CPU related metrics and memory related metrics, for example. Aniketos then constructs (step 22) an enclosure 24 representing the normal execution of the monitored system. During the detection phase 14 Aniketos measures (step 26), collects (step 28), and processes (step 30) runtime measurements. During the detection phase 14, the geometric enclosure 24 is used to classify runtime measurements. Each data point (N-tuple of metrics) is classified as normal if located inside or on the enclosure (some normal points represented by designation 34 in FIG. 1), or anomalous if located outside of the enclosure (some normal points represented by designation 36 in FIG. 1). As shown in FIG. 1, the Aniketos fault detection/diagnosis, mitigation technique comprises a training (learning) phase 12 and a detection phase 14. During the training phase 12, Aniketos learns to recognize the normal behavior of the monitored system by constructing a geometric enclosure 24 around good measurements. During the detection phase 14, Aniketos observes the application measurements and uses the enclosure 24 to detect anomalous behavior. If Aniketos determines that the monitored system is in a faulty state, it triggers a fault-warning signal. This signal can be sent to a human system administrator or to an automated fault mitigation system that will attempt to correct the fault.

During the training phase, a monitored system executes its normal behavior and Aniketos collects measurements, in an example embodiment, at one second time intervals. The collected data is grouped into a training data set. The collection of measurements at runtime continues until Aniketos has enough training data points to adequately represent the normal behavior of the monitored system. This training data set is used to construct an N-dimensional geometric enclosure, where N is the number of distinct metrics used (i.e., CPU time, heap memory-dynamic memory allocation, etc.). Knowing when enough training data has been collected depends upon the system being monitored and is related to the testing adequacy problem. If a system has an extensive test suite that represents its normal behavior, then the execution of that test suite will produce a good training data set. It may also be beneficial to create the training data set from observations collected on a deployed system. Doing so creates a training set that captures how the system is typically used. To collect a representative training data set from a deployed system, the training period can include the full spectrum of conditions under which the system normally operates. In an example experiment described in more detail herein, a case study mirrored a website. To capture normal system behavior, Aniketos collected measurements while a test system served requests that were played back from logs that were collected when the production web server was being used over a one-week period. Because the amount and rate of HTTP requests varied with the days of the week, a full week of execution was used to collect a representative training data set.

Software sensors are generated to monitor various aspects of the software such as, for example, memory usage, run-time stack size, system calls for accessing the file system and network, remote calls to other services, and queries to databases. The sensors can be passive sensors, active sensors, or a combination thereof. Passive sensors monitor services from afar (i.e., outside of the executing service's process), akin to system activity monitors that exist in operating systems. Active sensors functions are woven into appropriate locations in the service's code. In some cases, active sensors can provide more detailed and system-specific data than passive sensors. The data that is extracted by the sensors is used to compute an appropriate set of metrics that can formally characterize a service's expected behavior. A test suite can be used to exercise the service under a variety of scenarios (i.e., use cases). The sensors gather data from the execution of the use cases. These data can subsequently be provided, as input, to a set of techniques to produce formal characterizations of the expected behavior of a service. Once the expected behavior of a service has been characterized, deviations from the expected behavior at run time are used to diagnose potential failures. For example, the tools might detect that a function that usually executes on the stack for a brief duration is spending an abnormal amount of time executing that function. This can cause the service to diagnose a buffer-overflow attack, because such attacks often overwrite the program counter on the run-time stack and cause the service to branch to malicious code injected into the address space of the process running the service. After the diagnostic capabilities are in place, methods are investigated to mitigate the effects of a service failure. For example, a service may disable some of its features if a fault is found in it rather than crash. Likewise, the diagnosis of a memory leak may result in the service re-starting itself. A preliminary diagnosis of a security attack may cause the service to increase its logging to facilitate a postmortem analysis.

In an example embodiment, two kinds of sensors are generated to monitor the behavior of services at run time: (1) passive sensors, and (2) active sensors. Passive sensors execute as separate processes on the same machine as the services being monitored. An activity monitor, similar to the process monitoring tools supported by operating systems, is an example of a general-purpose passive sensor. Passive sensors typically do not require modification to the code of the monitored services. Passive sensors are also unobtrusive from a performance perspective. Passive sensors monitor the most general properties of a service, such as: how much real and virtual memory a service is using, how many read and write operations it makes to disk, what network ports it accesses, and how many incoming and outgoing network packets it processes.

Active sensors are custom functions that are woven (incorporated) into the source code of a monitored service in order to measure specific attributes such as: the number of times a particular file was opened, the number of dynamic memory allocations made by the service, the number of times a key variable was modified, and the number of system calls the service made during its execution. Tools weave active software sensors into the code of a service. Lightweight sensors that do not incur a significant run-time performance penalty, along with an appropriate placement of the sensors in the service's code, are necessary to create an unobtrusive service monitoring capability. Aspect-oriented programming is an example technology used to weave sensors into the code of the monitored services. In an example embodiment, passive sensors are sufficient to monitor most services and active sensing is reserved for monitoring the most critical services.

Once a geometric enclosure is constructed, the geometric enclosure is used to detect faulty behavior. Each data point (i.e., N-tuple of N metric measurements) outside of the enclosure is labeled anomalous. Data points outside of the enclosure when the system is in a normal state are referred to as false positives. The percentage of false positives during a given time period is referred to as the false positive rate. In the case study the false positive rate was between 2% and 3%. To avoid sending false fault-warning signals, Aniketos uses a time smoothing method analogous to a capacitor. The capacitor method keeps track of a charge value which is initialized to 0. Each time a point is classified as anomalous, the charge value is incremented by 1. Additionally, once the charge value is greater than 0, it begins to slowly discharge. If the charge grows larger than a threshold, a fault-warning signal is issued. If the occurrences of anomalies are low during a time period, the charge will not grow enough to trigger a fault warning. Because Aniketos samples at discrete intervals, the charge is approximated using the following equation:

$$C_t = \sum_{i=t-p}^{t} d^{t-i} c_i$$

In this equation $C_t$ is the charge at time t, $c_i$ is 1 if the data point at time i is outside of the enclosure and 0 otherwise, p is the number of successive data points considered, and d is the discount rate. The discount rate must be greater than 0 and less than 1. The discount rate can be determined in any appropriate manner. For example, the discount rate can be determined by the user and/or the discount rate can be determined automatically using any appropriate search algorithms such as genetic algorithms, or the like.

Figure 2:
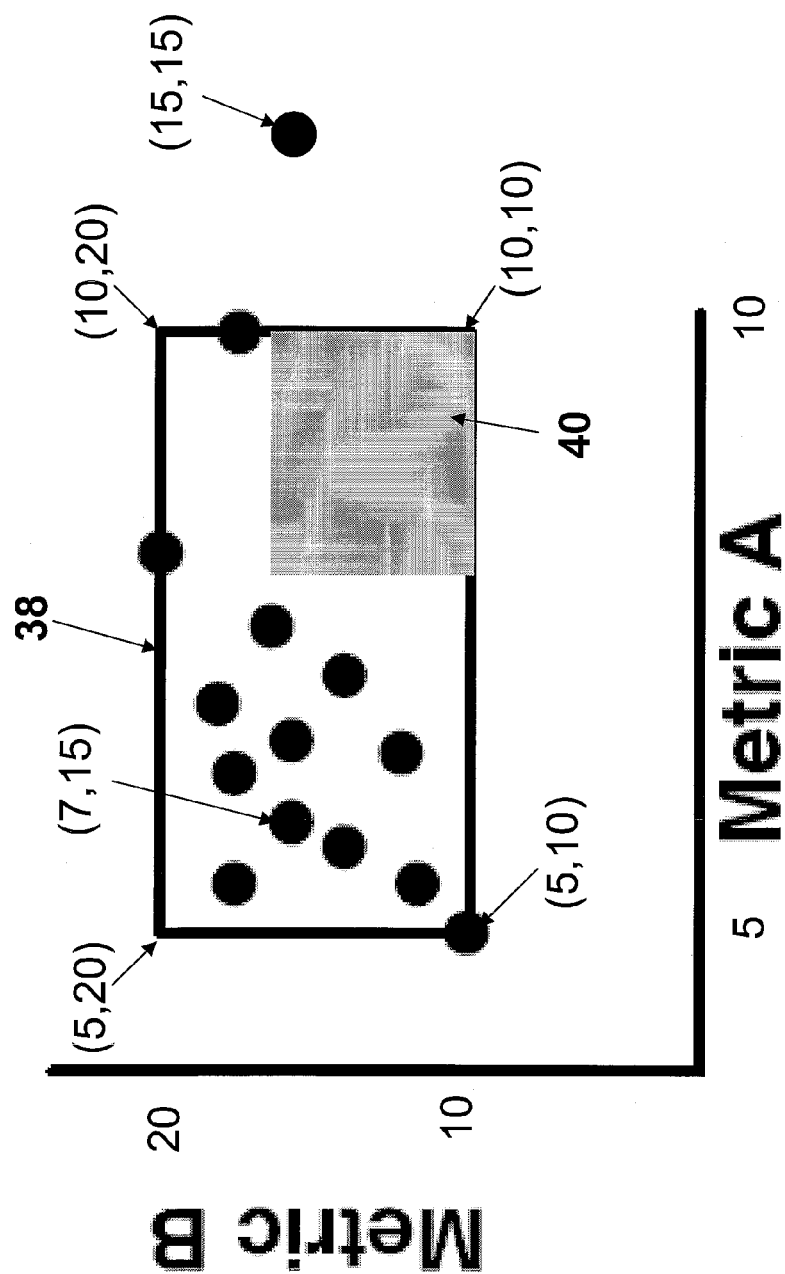
FIG. 2 illustrates a hyper-rectangle 38 that overestimates a shape of a normal space.

FIG. 2 illustrates a hyper-rectangle 38 that overestimates a shape of a normal space. A hyper-rectangle 38 can be generated in N-dimensional space wherein each dimension represents one of N metrics. For example as shown in FIG. 2, given 2 metrics, A and B, if the safe range for metric A is 5 to 10 and the safe range for metric B is 10 to 20 the normal behavior of the system can be represented as a 2-dimensional rectangle 16 with the vertices (5,10), (5,20), (10,20), and (10,10). Any data point that falls within that rectangle, for example (7,15), is classified as normal. Any metric that falls outside of the rectangle, for example (15,15), is classified as anomalous. The hyper-rectangle 38 enclosure overestimate the normal operating region for an application, as illustrated by area 40. Better results can be achieved if a more compact enclosure containing the safe data points is used; for example, a convex-hull.

Figure 3:
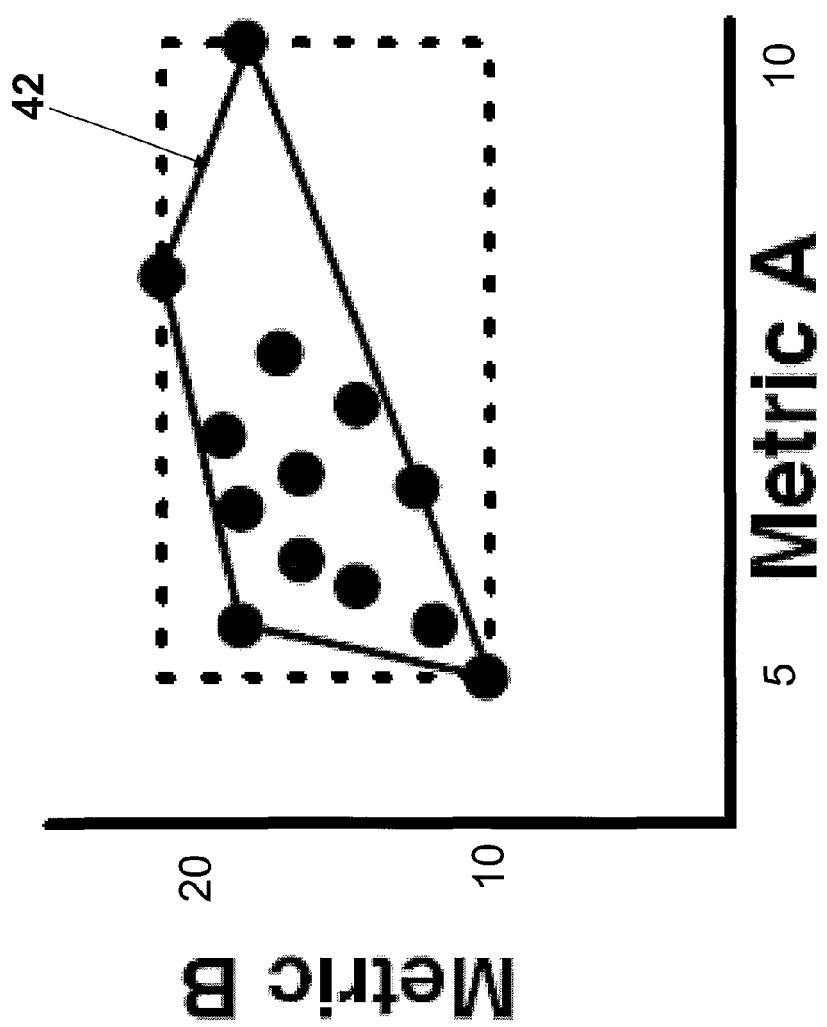
FIG. 3 illustrates a convex hull 42 constructed around the same data set shown in FIG. 2.

FIG. 3 illustrates a convex hull 42 constructed around the same data set shown in FIG. 2. The convex hull 42 is the smallest convex polygon that contains all of the points. A convex hull for a set of points P in a real vector space is the minimal convex set containing P. Intuitively, for planar objects, the convex hull may be visualized by imagining an elastic band stretched open to encompass the given object; when the band is released it will assume the shape of the convex hull. For higher dimensions, similar to the ones used in the herein describe technique, one can imagine objects enveloped in an elastic membrane under tension. For the purposes of the herein described technique, the convex hull is a region that represents a formal characterization of a feature's expected (i.e., normal) operational boundaries. A convex polygon is a polygon such that for every two points inside the polygon the straight-line segment between those points is also inside of the polygon. A convex-hull for a set of points in one-dimensional space is a line segment between the largest and smallest values. In two-dimensional space one can think of each point as a peg on a board and the convex hull as the interior of a rubber band that snaps around all of those pegs. In three-dimensional space one can think of the convex-hull as the interior of an elastic membrane stretched around points. If the metrics used are not independent, the convex-hull may be a better approximation to the true safe region than the hyper-rectangle. If there is a dependency between metrics then the convex-hull will be smaller than the hyper-rectangle and may produce better detection results. Any faults detected by the hyper-rectangle will be detected by the convex-hull because the convex-hull is subsumed by the hyper-rectangle. The convex-hull may detect faults faster than the hyper-rectangle but not slower and the convex-hull may detect faults that the hyper-rectangle can not detect.

Aniketos can make use of both dependent and independent metrics. Aniketos does not require any prior knowledge that metrics are correlated. Correlation methods usually capture dependencies between two or three metrics. Using Aniketos, it has been observed that instances where fault detection relied on the dependencies between as many as five metrics. If a correlation between a set of metrics is known to be useful for detection, it can be used as a dimension in the convex hull in addition to the dimensions that correspond to the other metrics.

To characterize the behavior of a service (e.g., software application) from the data gathered by the software sensors, a snapshot approach can be utilized, a time series approach can be utilized, or a combination of snapshot and time series approaches can be utilized. Note that the snapshot approach is actually a special case of the time series approach.

Figure 4:
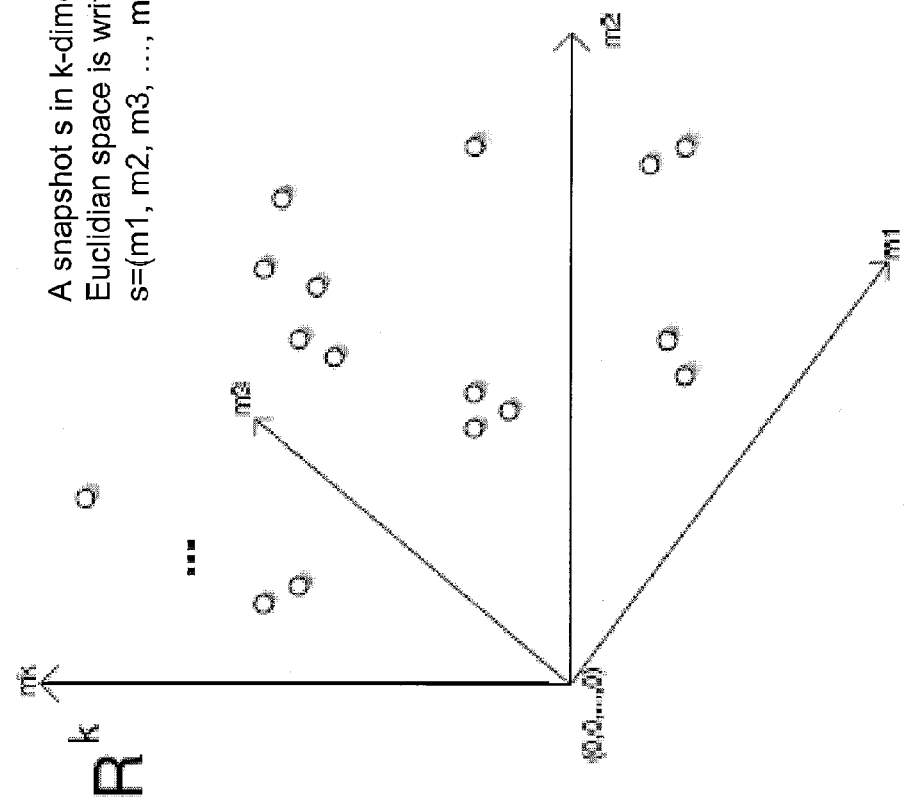
FIG. 4 is an example illustration of a graph 44 that characterizes service behavior via the snapshot approach.

FIG. 4 is an example illustration of a graph 44 that characterizes service behavior via the snapshot approach. The snapshot approach characterizes the behavior of a service as a set of vector values, called snapshot points, in k-dimensional Euclidean space ($R^k$). The snapshot points represent the service at a singular moment in time. The value of k corresponds to the number of metrics, N, used in the characterization. A snapshot point, s, is a k-dimensional vector s=(m1, m2, m3, . . . mk) in $R^k$. FIG. 4 illustrates the behavior characterization of a service using a sample of 16 snapshot points. The value of k can be determined in any appropriate manner, such as via experimentation for example. Typically, the number and type of metrics needed to characterize services in a meaningful way is unknown. Moreover, the number of snapshot points needed for a characterization is unknown. Furthermore, it is not known whether each metric of a snapshot point should be weighted equally because, for example, memory usage may be a more significant metric than stack size. Experimentation facilitates determining the answers to these questions.

The time-series approach is a generalization of the snapshot approach. The time series approach does not rely on snapshot points that are recorded at singular moments in time. Rather, in the time-series approach, each point represents a series of snapshot points, whose values were taken over a period of time. The time-series approach characterizes the behavior of a service as a set of array values, called time-series points, in (k×l)-dimensional Euclidean space ($R^k$×l), as depicted in FIG. 5. In this time series characterization, k corresponds to the number of metrics used in the characterization and l corresponds to the number of snapshot points in the time series. A time-series point t is a (k×l)-dimensional vector in $R^k$×l. Each column indicates the values of a metric as it progresses through time from moment l to moment l. Likewise, each row indicates a snapshot (i.e., a vector of metric values) at a specific moment in time. Each time-series point represents a history of l steps for each metric. Hence, the characterization takes into account how the values of the metrics change over time. The value of l can be determined in any appropriate manner, such as, for example, experimentally. Also, experiments can be used to determine if older values of a metric in a time series should be weighted less than more recent values in the same time series.

Once the service has been characterized (e.g., via the snapshot or the time-series approach), the service's characterization can be refined further to enable a service to diagnose a potential failure. This involves executing each feature of the service using a variety of inputs and recording a number of points (snapshot or time series) in multi-dimensional space. Since the features being executed are known, an attribute can be assigned to each point to indicate a respective point's corresponding feature.

The points measured for each feature are used to define a convex hull. The visible point in each convex hull represents the centroid points of the respective convex hull. As described above, the convex hull is a region that represents a formal characterization of a feature's expected (i.e., normal) operational boundaries. For example, at run time, if a snapshot or time-series point of the currently executing service falls within the boundaries of a specific convex hull, it is assumed that the service is operating normally and executing the feature that maps to that convex hull. Since it is possible for more than one convex hull to intersect, a decision is made to determine which unique convex hull (i.e., which feature of the service) corresponds a point when it is in an ambiguous region of the Euclidean space. In an example embodiment, this decision is determined by the distances of a point to the centroids of the intersecting convex hulls. The centroid of a cluster is the average vector of all of the points in the cluster. When a deployed and executing service is in a state (i.e., point in the Euclidean space) that is in an ambiguous region (i.e., the point is inside more than one convex hull) it will be assigned to the convex hull to whose centroid it is closest. A service is considered to be failing if its current point is outside of every convex hull. If this is true, the service may have a fault (e.g., a memory leak) or may have been subjected to a security attack (e.g., a buffer overflow caused a service that does not make system calls to suddenly start making them).

In an example embodiment, when a service is diagnosed as failing, a control algorithm will activate a detailed logging mechanism for later forensics analysis as well as enable a mitigation action that will attempt to stabilize the service. If the mitigation action fails, another will be tried, and so on, until no more mitigation actions are available or an effective mitigation action is found. If no mitigation actions stabilize the service, a reasonable final action could be to shut down the service. However, if one of the mitigation actions succeeds in stabilizing the service, the technique adds the problem point to the characterization space of the service and annotates the point with the mitigation action that proved effective. Over time, the characterization space will become populated with problem points that are clustered according to the corresponding successful mitigation action. Namely, the mitigation technique will continuously evolve a convex hull for each mitigation action during the execution of a service. It is expected that the evolution of these convex hulls will be useful for maintaining future versions of the service.

Figure 6:
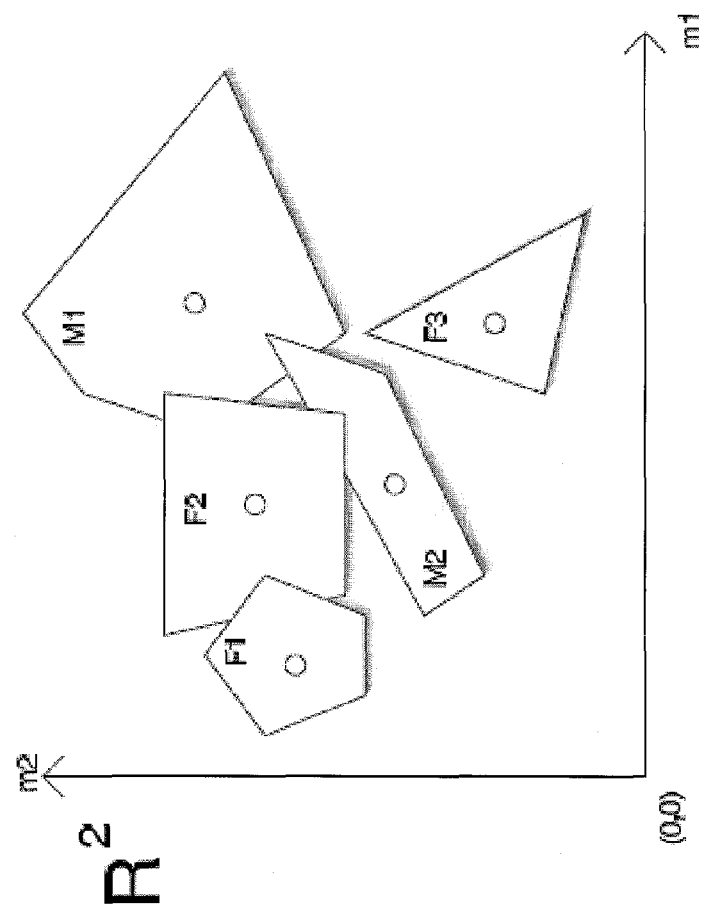
FIG. 6 illustrates an example plot 46 of a snapshot space of two metrics ($m_1$, $m_2$) with a set F=$F_1$, $F_2$, $F_3$ of three feature convex hulls and a set M=($M_1$, $M_2$) of two mitigation convex hulls.

FIG. 6 illustrates an example plot 46 of a snapshot space of two metrics ($m_1$, $m_2$) with a set $F=F_1, F_2, F_3$ of three feature convex hulls and a set $M=(M_1, M_2)$ of two mitigation convex hulls. As depicted in FIG. 6, when a service starts to execute, its characterization space can comprise, for example, a set, F, of convex hulls, one for each feature of the service. Initially, the characterization space will have no convex hulls that correspond to mitigation actions. The first time the service's current point escapes all of the convex hulls in F, the technique will start to apply mitigation actions, one after the other, until the current point moves back into one of the convex hulls in F. At that time, the technique will add the problem point to the characterization space and assign it to a mitigation convex hull. Over time, the characterization space will evolve and a new set of convex hulls M will appear as a complement of the unchanged convex hulls in F. This will enable the mitigation technique to observe a future point that has escaped the convex hulls F and detect if that point is now in the convex hull of one of the mitigation actions. If it is, then the corresponding mitigation action will be activated. If it is not, a series of mitigation actions will be applied until one works or the technique runs out of actions. In the latter case, the service could be instructed to shut down, in the former case, the problem point will be assigned to the appropriate mitigation convex hull. Since it is possible for the convex hulls in M to intersect with the convex hulls in F, in an example embodiment, the diagnostic technique will test for membership in the convex hulls of M after it ensures that the current point is not a member of any of the convex hulls in F. Non-limiting example mitigation actions include: shut down a service, disable a service's feature, restart a service, disable a service's disk access, disable a service's network access through certain sockets, and disable a service's access to a database. The herein described technique supports supervised and unsupervised activation of mitigations. This option is useful when the technique is used only to detect unanticipated behavior but relies on a human operator to authorize the activation of mitigations manually.

Figure 7:
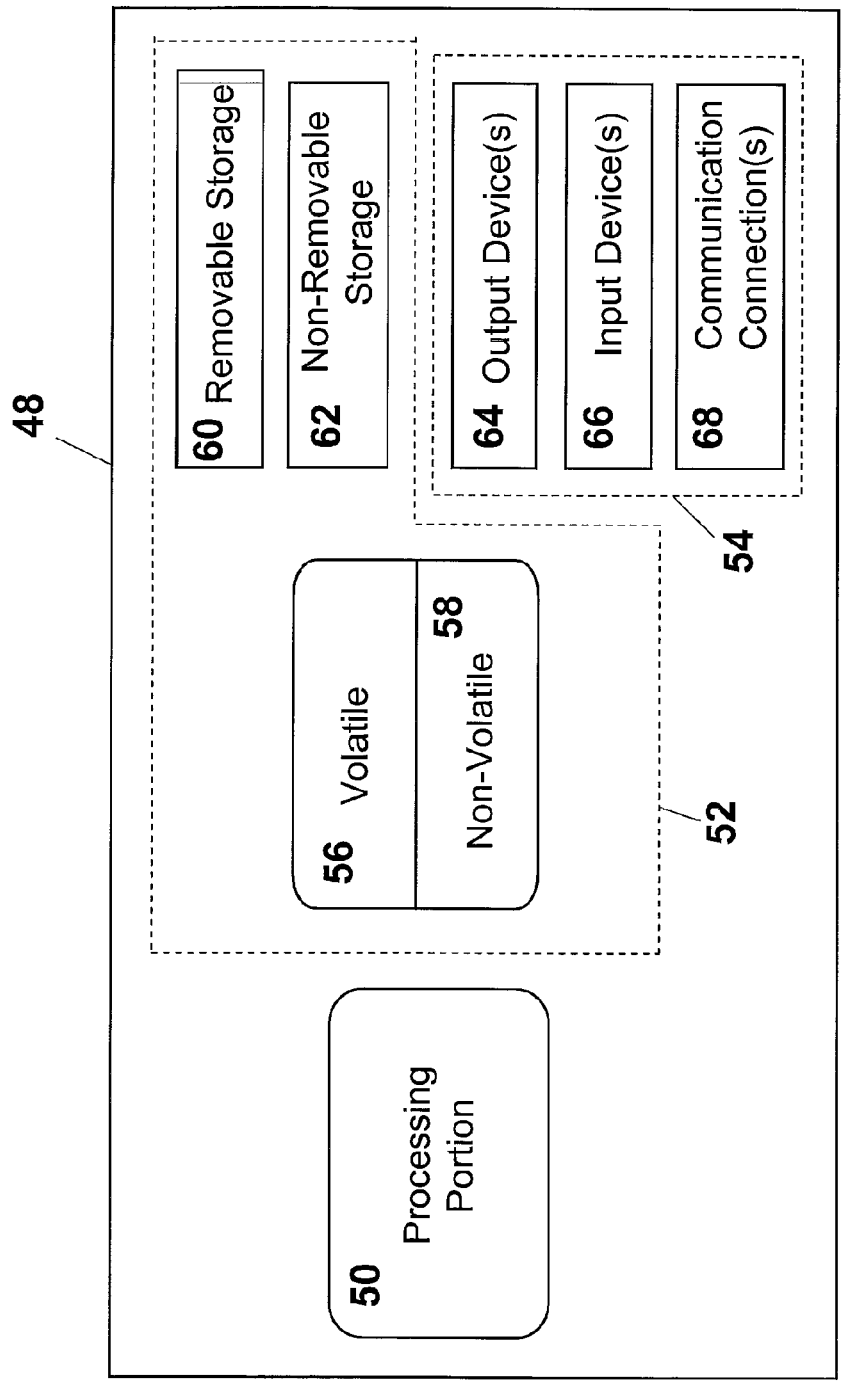
FIG. 7 is a block diagram of an example processor 48 configured to detect, diagnose, and/or mitigate software faults utilizing an anomaly based computational geometry technique.

FIG. 7 is a block diagram of an example processor 48 configured to detect, diagnose, and/or mitigate software faults utilizing an anomaly based computational geometry technique. The processor 48 is a device that can comprise hardware or a combination of hardware and software. The processor 48 depicted in FIG. 7 can represent any appropriate device, examples of which include a desktop, a server, a dedicated processor, a general purpose processor, a laptop, a personal digital assistant ("PDA"), a portable phone (e.g., a cell phone or the like, a smart phone, a video phone), or a combination thereof.

It is emphasized that the block diagram depicted in FIG. 7 is exemplary and not intended to imply a specific implementation or configuration. Thus, the processor 48 can be implemented in a single processor or multiple processors. The processor 48 can be distributed, centrally located, and/or integrated. Multiple components of the processor 48 can communicate wirelessly, via hard wire, or a combination thereof.

In an example configuration, the processor 48 comprises a processing portion 50, a memory portion 52, and an input/output portion 54. The processing portion 50, memory portion 52, and input/output portion 54 are coupled together (coupling not shown in FIG. 7) to allow communications therebetween. The input/output portion 54 is capable of receiving and/or transmitting information. In an example embodiment, the input/output portion 54 is capable of receiving/providing information pertaining to measuring data, collecting data, processing data, generating a characterizing polygon, convex hull or the like, mitigation actions, actions to take upon discovery of a fault, or any combination thereof as described herein.

The processing portion 50 is capable of performing functions pertaining to detecting, diagnosing, and/or mitigation software faults utilizing an anomaly based computational geometry technique as described herein. For example, the processing portion 50 is capable of measuring data, collecting data, processing data, generating a characterizing polygon, convex hull or the like, determining mitigation actions, determining action to take upon detecting a fault, or any combination thereof as described herein.

In a basic configuration, the processor 48 can include at least one memory portion 52. The memory portion 52 can store any information utilized in conjunction with measuring data, collecting data, processing data, generating a characterizing polygon, convex hull or the like, mitigation actions, actions to take upon discovery of a fault, or any combination thereof as described herein.

Depending upon the exact configuration and type of processor 48, the memory portion 52 can include computer readable storage media that is volatile 56 (such as some types of RAM), non-volatile 58 (such as ROM, flash memory, etc.), or a combination thereof. The processor 48 can include additional storage, in the form of computer readable storage media (e.g., removable storage 60 and/or non-removable storage 62) including, but not limited to, RAM, ROM, EEPROM, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, a subscriber identity module (SIM) of a mobile communications device, or any other medium which can be used to store information and which can be accessed by the processor 48.

The processor 48 also can contain communications connection(s) 68 that allow the processor 48 to communicate with other devices, network entities, terminations, or the like. A communications connection(s) can comprise communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. The term computer readable media as used herein includes both storage media and communication media. The system also can have input device(s) 66 such as keyboard, mouse, pen, voice input device, touch input device, etc. Output device(s) 64 such as a display, speakers, printer, etc. also can be included.

The processor 48 also can contain a UI (user interface) portion allowing a user to communicate with the processor 48. The UI portion is capable of rendering any information utilized in conjunction measuring data, collecting data, processing data, generating a characterizing polygon, convex hull or the like, mitigation actions, actions to take upon discovery of a fault, or any combination thereof as described herein. The UI portion can provide the ability to control the processor 48, via, for example, buttons, soft keys, voice actuated controls, a touch screen, movement of the mobile processor 48, visual cues (e.g., moving a hand in front of a camera on the processor 48), or the like. The UI portion can provide visual information (e.g., via a display), audio information (e.g., via speaker), mechanically (e.g., via a vibrating mechanism), or a combination thereof. In various configurations, the UI portion 40 can comprise a display, a touch screen, a keyboard, an accelerometer, a motion detector, a speaker, a microphone, a camera, a tilt sensor, or any combination thereof. The UI portion can comprise means for inputting biometric information, such as, for example, fingerprint information, retinal information, voice information, and/or facial characteristic information.

Figure 8:
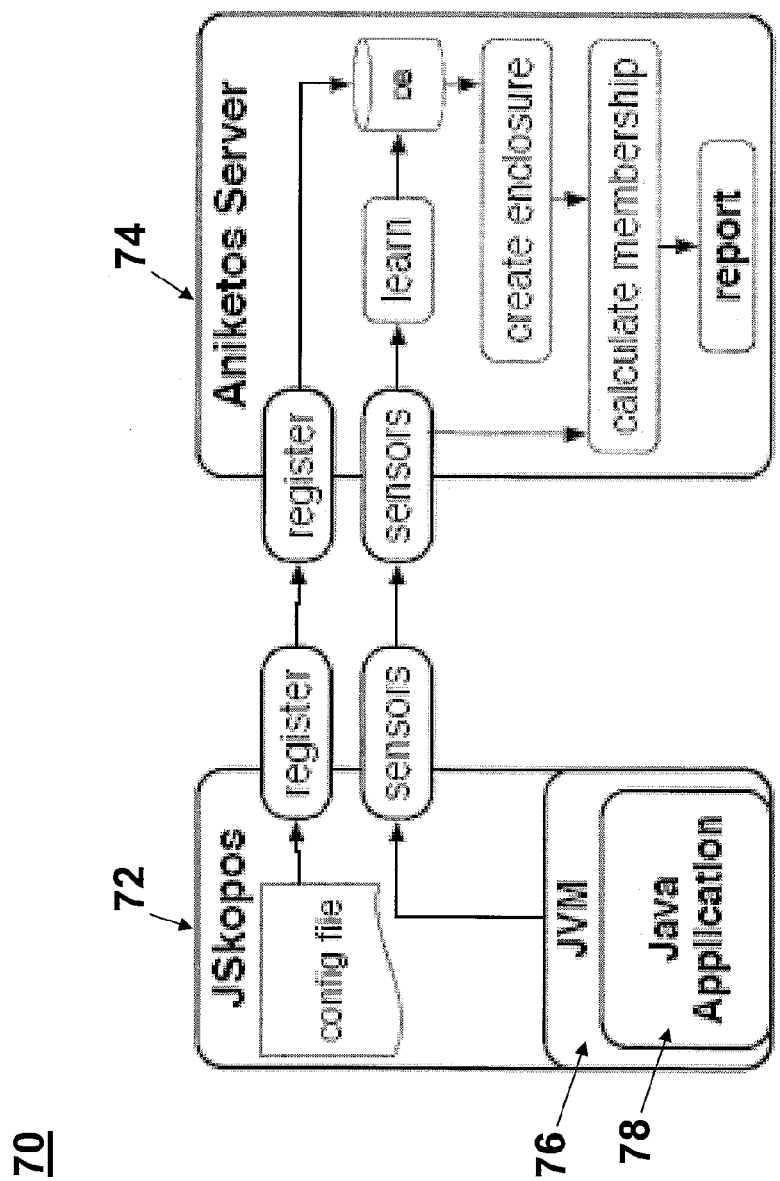
FIG. 8 depicts an example system 70 for implementing Aniketos.

FIG. 8 depicts an example system 70 for implementing Aniketos. It is to be understood that the system depicted in FIG. 8 is merely an example system and is not to be construed as limiting. The example system 70 represents a configuration that was used in an experimental implementation of Aniketos. The system 70 comprises two components, the JSkopos wrappers 72 and the Aniketos server 74. JSkopos 72 is a wrapper around Java applications that collects sensor measurements directly from the JVM using JMX. JSkopos 72 registers with the Aniketos server 74 and streams sensor measurements at a sample rate of once per second. The Aniketos server 74 uses the measurement stream to learn the normal behavior of the system by constructing multidimensional geometric enclosures. Once the normal behavior is learned, the Aniketos server uses the incoming stream to classify the application being monitored as operating normally or not. Thus, the JSkopos wrappers 72 monitor applications and transmit collected measurements to the Aniketos server 74 via a JSkopos Protocol. The Aniketos server 74 processes data and determines if the application being monitored is operating as expected. In an example configuration, Aniketos is configured to provide JSkopos for monitoring applications running on the Sun Java Virtual Machine (JVM) 76. Developers can provide sensors that are specific to the application being monitored and use the JSkopos Protocol to create their own wrappers for any language. Aniketos is designed to have minimal impact on monitored applications. The most computationally expensive operations, such as constructing multidimensional geometric enclosures, are handled by the Aniketos server 74, which, in an example embodiment, can run on a separate machine. In an example configuration, the JSkopos wrappers 72 are executed on the same machine(s) as the applications being monitored, and thus are developed to be lightweight processes. In an experimental configuration, Aniketos was observed to add approximately 3.3% to 11.1% overhead with all sensors activated. When a single client sequentially requested a small text file thousands of times the overhead of JSkopos was 4.2% on average. This decreased to 3.3% on average when a large PDF file was instead requested. When the same experiments were run with 10 concurrent clients repeatedly requesting the same file, the overhead increased to 11.1% for the small text file and to 7.4% for the large PDF file. JSkopos automatically records when a new socket is created or closed. In the experimental configuration, a new socket was opened for every HTTP request. As a result sockets were opened and closed at a typically faster rate when smaller files were requested. This was evident in the increase in overhead when smaller files were requested.

Aniketos provides control in choosing how applications are monitored. While there may be some overlap, the set of sensors useful in monitoring a web server will be different from the set of sensors useful in monitoring an image-processing application. Sensors most pertinent to an application can be selected. FIG. 8 depicts the interactions between the Aniketos server 74, the JSkopos wrapper 72, and a Java application being monitored 78. JSkopos uses Java Management Extensions to collect sensor measurements from the monitored JVM 76. After registering with the server 74, JSkopos 72 streams the measurement data to the Aniketos server 74 at a rate of one set of measurements per second. In the experimental configuration, JSkopos was able to extract twenty-seven measurements for various metrics. The following seven metrics were selected for monitoring a web server.

1. Loaded Class Count: Number of classes loaded in the JVM.
2. TotalMemory: Amount of heap and non-heap memory used by the JVM.
3. TCP Bytes Read and Written: Number of bytes read and written using TCP across all sockets.
4. TCP Accept Sockets Alive: Number of accepted sockets open (clients connected to this application's server socket).
5. CPU Time Average: Average CPU time percentage across all threads executed by the JVM.
6. Stack Depth Average: Average stack depth of all threads currently running.
7. Thread Count: Number of threads currently running in the JVM.

Note that this is not a limit of the Aniketos detection technique. Many of the unused metrics were either irrelevant or redundant for the task of monitoring a web server. For example, several CPU and memory metrics are highly correlated with one another and thus are redundant. The Aniketos technique can use as many metrics as the user wants. Note that including more metrics, even if they are not useful, does not impact the results produced by the detection algorithm A case study is presented to demonstrate the advantage of using a convex-hull enclosure for fault detection over other geometric enclosures, such as a hyper-rectangle. This case study involves eight experiments and each experiment injects a different fault into an HTTP server. The convex hull method makes no assumption about any relationship among the different kinds of measurements, but takes advantage of dependence relationships if they exist. In the case study the convex-hull enclosure performed fault detection better than the hyper-rectangle enclosure, which treats measurements as independent. In fact, in the experiments three of the nine faults were detected by the convex-hull method, but not by the hyper-rectangle method. Although the case study uses only the hyper-rectangle and the convex-hull enclosures, Aniketos supports any type of geometric enclosure. For example, a sphere or an ellipsoid could be used in place of a hyper-rectangle or a convex-hull.

Figure 9:
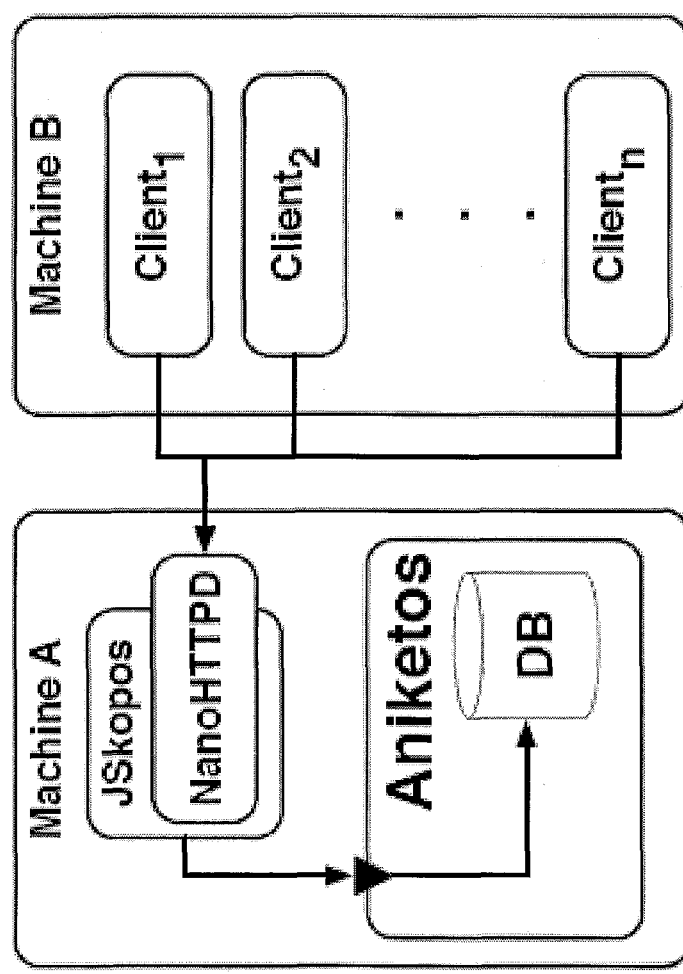
FIG. 9 depicts the design of the test bed used in this case study.

To evaluate Aniketos a case study was conducted that involves monitoring a Java-based web server referred to as NanoHTTPD. FIG. 9 depicts the design of the test bed used in this case study. One machine is used to host the Aniketos server and NanoHTTPD and another machine manages clients that request resources from NanoHTTPD. JSkopos is used to monitor NanoHTTPD's execution and report measurements to the Aniketos server. The Aniketos server stores the gathered data and processes it using QHull.

NanoHTTPD was chosen for this case study because it is open source and manageable in size, thus making it easy to modify and to inject with faults. It is a web server that hosts static content. NanoHTTPD spawns a new thread for each HTTP client request. If a thread crashes or goes into an infinite loop, it does not compromise NanoHTTPD's ability to serve other files.

The goal of this case study was to evaluate the performance of the Aniketos detection technique in a realistic scenario. To this end, it uses resources and access patterns of a website. Nine weeks worth of website access logs were collected and all resources accessed in those logs were extracted and converted into static HTML pages. Out of the nine weeks of logs, three weeks were chosen, at random, to be used in the case study. These were replayed against the statically hosted version of the website and provided the case study with realistic workload access patterns.

One week of request logs was used to generate hyper-rectangle and convex hull enclosures representing the normal operating space of NanoHTTPD. Another week of request logs was used to evaluate how well the enclosures classify fault-free data. A third week of request logs was used as background activity during the fault injection experiments.

NanoHTTPD was injected with nine faults. These faults capture coding errors as well as security vulnerabilities and attacks. Two of the most common coding errors are the infinite-loop and the infinite-recursion faults. An infinite-loop fault is presented as a while loop that iterates indefinitely. Two versions of this fault were created. One in which each iteration of the loop does nothing, and the second in which each iteration of the loop performs a sleep operation for 100 ms. The goal of the slow infinite-loop fault was to create a more realistic scenario in which an infinite-loop is not simply a drain on the CPU resource. Similar to the infinite loop fault, the infinite-recursion fault also has two versions, a regular and a slow one that performs a sleep operation for 100 ms. An infinite-recursion is presented as a function calling itself until the thread running it crashes due to a StackOverflowError exception.

Another common fault injected into NanoHTTPD was the Memory-Leak fault. Two versions of this fault were created. The first version performed a realistic memory-leak and leaked strings containing the requested URLs by adding them to a vector stored in memory. The second version of the memory-leak fault doubled the size of the leak vector with each request.

Log-explosion is another problem common to the server environment and was injected into NanoHTTPD. The log-explosion fault causes NanoHTTPD to continuously write to a log file until there is no more space left on the hard drive. While this does not cause the web server to crash, the log-explosion fault does cause degradation in performance.

In addition to faults due to coding errors, two security attacks were perpetuated against NanoHTTPD. In the first, NanoHTTPD was injected with a spambot Trojan. Once triggered, the spambot began to send spam email message packets to an outside server at a rate of 3 emails/second. Each message was one of three spam messages chosen at random and varied in length between 166 and 2325 characters each.

The second attack perpetuated against NanoHTTPD was a denial of-service (DOS) attack. During the DOS attack several processes that continuously requested resources from NanoHTTPD were launched from two separate machines. The attack escalated with about 100 new processes created every second. It continued until NanoHTTPD could no longer process legitimate requests. Each fault was triggered by a specific URL request. For example, the memory leak fault was triggered by accessing the "/memleak" resource via a web browser. Each fault was triggered after a minimum of one minute of fault-free execution. Each experiment was performed on a clean system, meaning that the Aniketos server, JSkopos, and NanoHTTPD were all reset between each experiment. Each fault experiment was conducted five times, using a different segment of fault-free traffic each time. The entire case study took about three weeks to execute. Most of that time was spent executing fault-free experiments and the Memory-Leak experiment. While all other fault experiments took only a few minutes, the Memory-Leak fault took several hours before NanoHTTPD failed irreversibly. The following section contains the results of these experiments and demonstrates the relative superiority the convex-hull method over the hyper-rectangle method.

Two types of experimental results presented. The first are the false-positive rates observed during the experiments and the second is the performance of Aniketos with respect to fault detection. These experiments were designed to compare the performance of the convex hull method to the hyper-rectangle method.

Because the convex-hull lies inside the hyper-rectangle the false positive rates for the hyper-rectangle will be no higher than the false positive rates for the convex-hull. Any data points that fall outside of the hyper-rectangle must fall outside of the convex-hull. Therefore, the convex-hull false-positive rate cannot be lower than the hyper-rectangle false-positive rate. The convex-hull false-positive rate can be higher than the hyper-rectangle false-positive rate because there may be regions inside the hyper-rectangle that are not inside the convex-hull.

FIG. 10 illustrates the false-positive results for enclosures constructed from seven individual twenty-four hour segments taken from one week of server traffic. The first column lists the days of the week, the second column shows the number of HTTP requests served each day of the week, and the third and forth columns show the percentage of non-fault data points that were outside of the enclosures. Individual twenty-four hour segments were considered to be insufficient to capture the normal operating space of NanoHTTPD hosting the website. False-positive rates for enclosures built using measurements from individual days varied from 3.1% to 99.7% for the convex-hull and from 2.4% to 7.3% for hyper-rectangle. The false-positive rates for the hyper-rectangle were lower than the results for the convex-hull. These results are due in part the variance in the number of requests processed. On day 7

(Saturday) 15072 requests were processed, as opposed to day 3 (Tuesday) when there were 50638 requests. It is not surprising that the geometric enclosures built from the segment of measurements that contain the fewest requests produced the highest false positive rate when used to classify data points from a full spectrum of system behavior. However, the enclosures built from the segment of measurements that contain the most requests do not have the lowest false positive rate.

FIG. 11 illustrates the false-positive results for multiple consecutive day training sets. The first column shows the number of day's worth of data used to construct the geometric enclosures. For all numbers of days n, all sets of n consecutive days were used. For example, for two day data sets we built enclosures from Monday and Tuesday, Tuesday and Wednesday, Wednesday and Thursday and so on. The results shown in FIG. 11 reflect the worst performance for any set of the corresponding number of days. For example 31.71% was the highest false-positive rate for any set of two days. The worst results are shown to illustrate the worst performance to be expected from randomly choosing n days as a training set. The false-trigger-rate column shows the percentage of time when the capacitor charge is over the threshold and would trigger a fault warning. The false-trigger-periods column shows the number of periods when the capacitor is over the threshold. A trigger period is a segment of time during which the charge of the capacitor does not drop below the threshold for more than fifteen minutes. False triggers are caused by server behavior that the Aniketos fault-detection technique does not recognize and a false-trigger period represents a single stretch of time when Aniketos does not recognize the server behavior. A false trigger period can be thought of as a single unrecognized event. The false-trigger period columns shows the number of unrecognized events and the false-trigger rate shows the percentage of time that these events covered. For example, for two day training data sets there were fifteen separate periods when the capacitor stayed over the threshold and these periods covered 28.5% of the experiment. These periods were separated by at least fifteen minutes of the capacitor staying below the threshold. For the one-day training data sets, the worst performing set had a single false-trigger period, but this period lasted for 99.62% of the experiment.

Seven days were considered to be sufficient because seven days is a natural cycle of the website's usage patterns. Therefore the false-positive rate was expected to decline as more days were used for the construction of enclosures. The hyper-rectangle approach yielded better results than the convex hull approach in the experiments that use training data sets of one to three days. The two enclosures had similar performance in experiments that used four to seven day training data sets. However, false positive rates are only one part of evaluating a fault detection technique. Enclosures that produce lower false-positive rate may not produce the best detection of true faults. Variation in the false-positive rate between the hyper-rectangle and convex-hull methods was observed. The hyper-rectangle method displayed less variation in the false-positive rate than the convex-hull method. This is because extreme points, those boundary points that define the enclosure, have a greater effect on the volume of the hyper-rectangle than the volume of the convex-hull.

Figure 12:
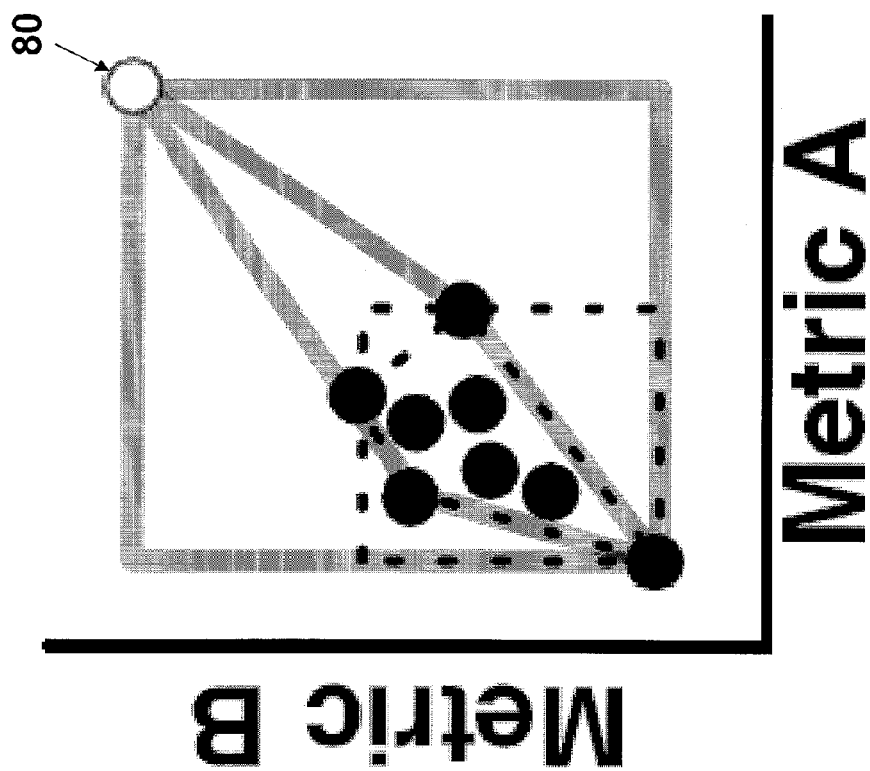
FIG. 12 illustrates the effect of a new point on two type of geometric enclosures.

FIG. 12 provides an example of this phenomenon. Notice that by introducing a single new point, the rectangle's area is affected more than that of the convex hull. When a new point is introduced, it has a greater effect on the rectangle than the convex hull. Black points are the original points. The white point 80 is the most recently added point. Dashed lines represent the original enclosures. Solid lines represent new enclosures that include the new point.

The results of the fault-detection experiments are illustrated in FIG. 13. All reported results are for enclosures constructed from a full week of measurements. It was expected that the detection of some faults would depend on the values of a single metric while other faults would be detected because of dependencies between two or more metrics. Therefore, the convex-hull method should detect some faults as fast as the hyper-rectangle method and others significantly faster. The results shown in FIG. 13 demonstrate the advantages, at least in part, of using the convex-hull method for fault detection. Of the eight fault experiments, there are three (Slow-Infinite-Recursion, Log-Explosion, and DOS-Attack) where the convex-hull method does not significantly outperform the hyper-rectangle method. In all three cases a single metric was enough to determine the presence of a fault effectively. Those metrics were Stack Depth Average in the case of the Slow Infinite Recursion fault, CPU Time Average in the case of the Log Explosion fault, and TCP Accept Sockets Alive or Thread Count in the case of the DOS Attack fault. In the remainder of the fault experiments, the convex-hull method outperformed the hyper-rectangle method significantly. The Memory-Leak and Infinite-Loop faults were detected by both the convex-hull and hyper-rectangle techniques. However, the convex-hull technique detected the faults significantly faster than the hyper-rectangle technique. This implies that even though there is a single metric that can be used as a predictor of the fault, a combination of metrics may be more efficient for the detection of that fault. To detect Memory-Leak and Infinite-Loop faults, the hyper-rectangle depended on the Total-Memory and CPU-Time-Average metrics. This result was expected because each of these two faults strains a single resource and can, therefore, be detected by observing that resource. An interesting result in these experiments was that the convex-hull method detected the faults significantly faster by exploiting the relationship between metrics. In addition to outperforming the hyper-rectangle method in some cases, the convex-hull method was also able to detect three faults that the hyper-rectangle method could not detect. These were the Slow-Infinite-Loop, Infinite-Recursion, and Spambot fault. It is clear that the relationship between metrics may be considered when detecting these faults. In the case of the Slow-Infinite-Loop fault, the Total-Memory metric and any of the following metrics may be considered: Loaded Class Count, TCP Accept Sockets Alive, Stack Depth Average, and/or Thread Count. In the case of the Infinite-Recursion fault, the Total-Memory metric and any of the following metrics maybe considered: Loaded Class Count, TCP Accept Sockets Alive, and/or Stack Depth Average.

Figure 14:
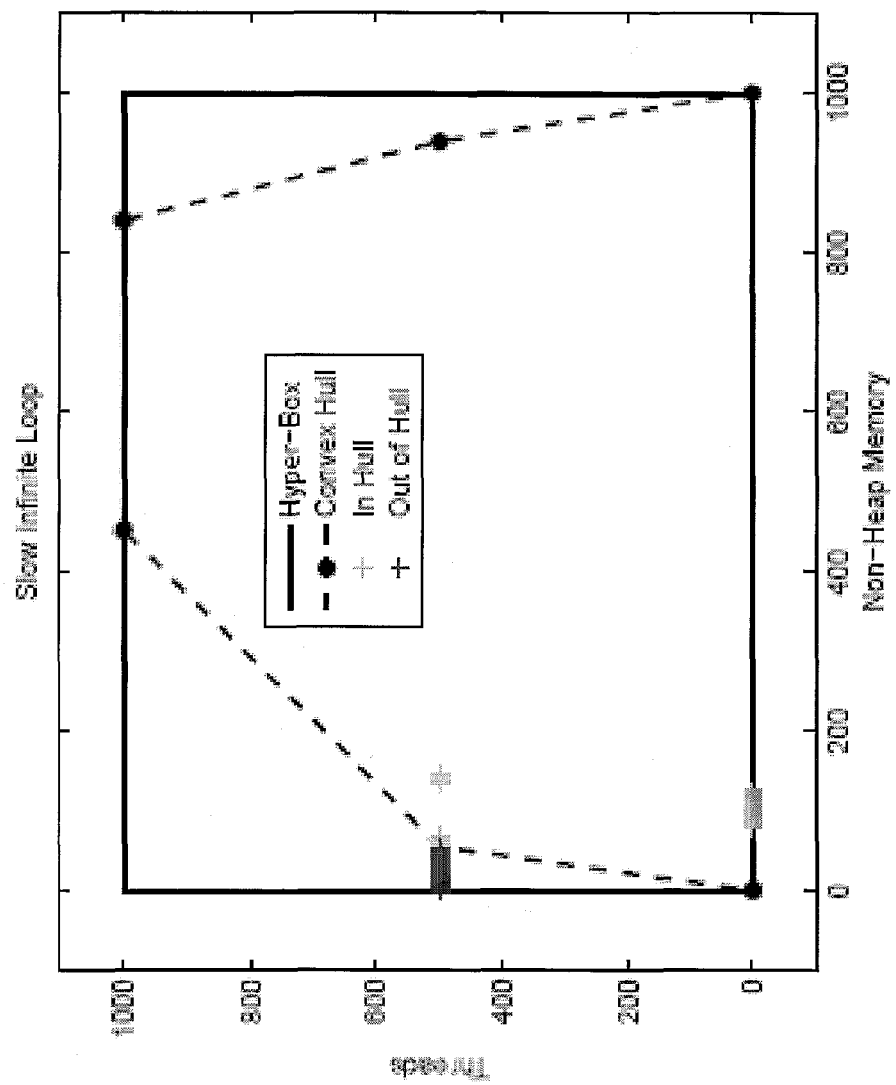
FIG. 14 illustrates example graphs depicting results of using a convex hull and using a hyper-rectangle.

In the case of the Spambot fault, the relationship between five metrics was considered. Those five metrics were Loaded Class Count, Total Memory, TCP Bytes Read and Written, CPU Time Average, and either TCP Accept Sockets Alive or Thread Count. Because the Slow Infinite Loop can be detected using only two metrics, that detection process can be illustrated in a two-dimensional figure. FIG. 14 illustrates why the convex hull method detected this fault while the hyper-rectangle method did not. The fault is triggered by a URL request that causes NanoHTTPD spawns a new thread. However, this thread does not handle the request and instead goes into a slow infinite loop. The convex hull method has observed that when a new thread is created, memory is allocated to handle the request. Therefore, when a new thread is created and no new memory allocation is detected, the convex hull method detects a fault. In contrast, the hyper-rectangle method treats each metric independently and has previously detected both a state in which a new thread is created and a state in which memory allocation is minimal. Therefore, it incorrectly judges the faulty behavior as normal.

The Infinite Recursion fault is similar in many respects to the Slow Infinite Loop fault. When the Infinite Recursion fault is triggered, it quickly crashes the thread created to handle the request. This places NanoHTTPD in a state similar to the one observed during the Slow Infinite Loop fault, with one exception. Once the thread crashes it is no longer alive and is therefore no longer counted by JSkopos. However, all other indicators, such as a live TCP accept socket, are present. Therefore, the convex hull method is still able to detect the Infinite Recursion fault. Since the Spambot fault used five metrics to be detected, it is not easily visualized. However, it is interesting to note that that TCP Accept Sockets Alive and Thread Count can be interchanged. This is because they are both indicators that a new request is being processed. The set of metrics used in the case study was chosen based on the opinion that these metrics would sufficiently capture Nano-HTTPD's execution. It is worth noting that each metric was used in detecting at least one of the faults presented in the case study. Overall, the case study demonstrates the advantages of the convex hull method over the hyper-box method and the feasibility of a computational geometry approach to fault detection.

Figure 15:
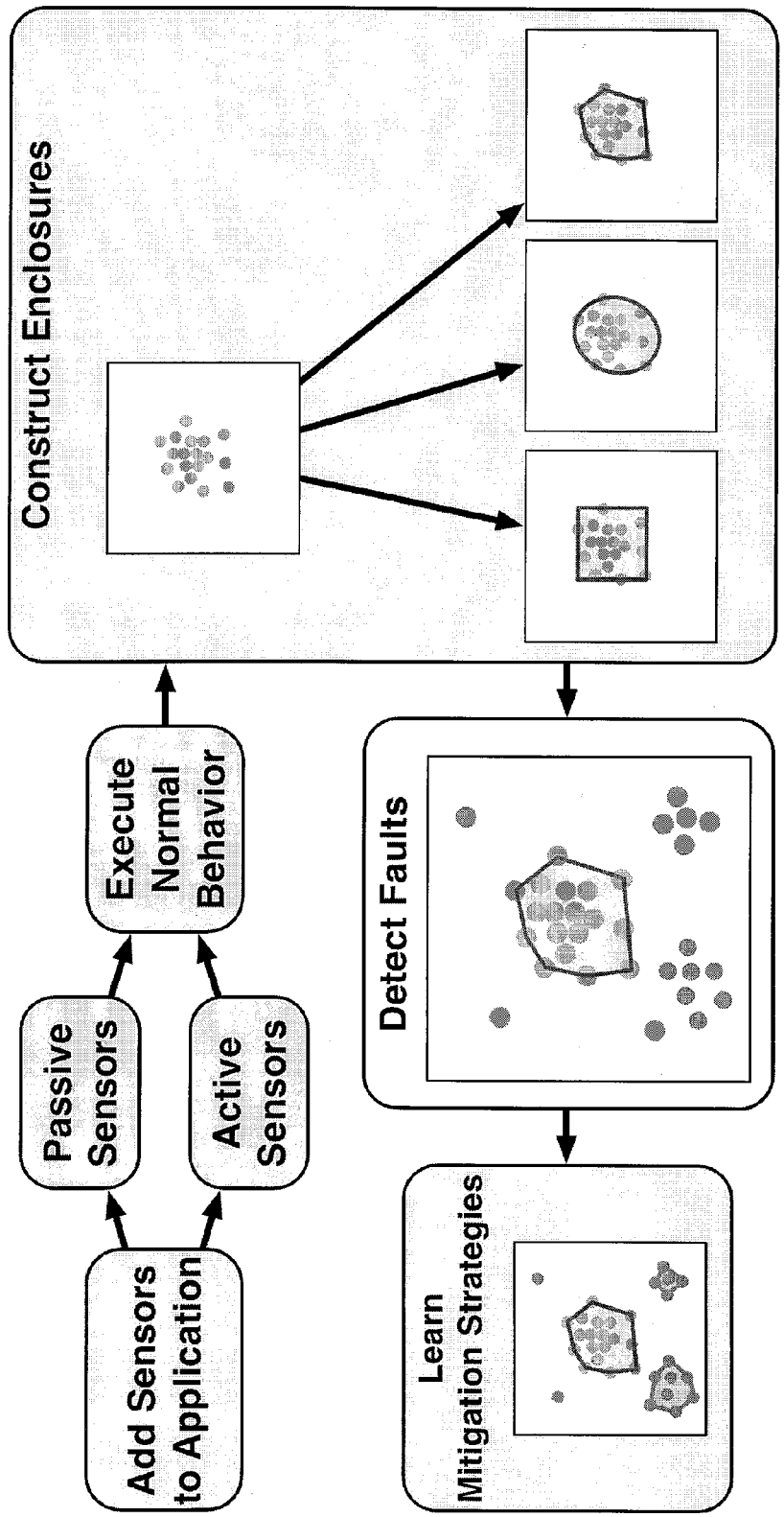
FIG. 15 is an example illustrative summary of detecting, diagnosing, and mitigation software faults utilizing an anomaly based computational geometry technique.

While example embodiments of an anomaly-based computational geometry technique for detecting, diagnosing, and/or mitigating software faults has been described in connection with various computing devices/processor, the underlying concepts can be applied to any computing device, processor, or system capable of performing an anomaly-based computational geometry technique for detecting, diagnosing, and/or mitigating software faults. The various techniques described herein and as summarized in FIG. 15 can be implemented in connection with hardware or software or, where appropriate, with a combination of both. Thus, the methods and apparatuses for an anomaly-based computational geometry technique for detecting, diagnosing, and/or mitigating software faults can be implemented, or certain aspects or portions thereof, can take the form of program code (i.e., instructions) embodied in tangible storage media having a physical structure, such as floppy diskettes, CD-ROMs, hard drives, or any other machine-readable storage medium (computer-readable storage medium). A computer-readable storage medium, as described herein, is an article of manufacture. When the program code is loaded into and executed by a machine, such as a computer, the machine becomes an apparatus for implementing an anomaly-based computational geometry technique for detecting, diagnosing, and/or mitigating software faults. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for an anomaly-based computational geometry technique for detecting, diagnosing, and/or mitigating software faults also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing an anomaly-based computational geometry technique for detecting, diagnosing, and/or mitigating software faults. When implemented on a general-purpose processor, the program code combines with the processor to provide a unique apparatus that operates to invoke the functionality of an anomaly-based computational geometry technique for detecting, diagnosing, and/or mitigating software faults. Additionally, any storage techniques used in connection with an anomaly-based computational geometry technique for detecting, diagnosing, and/or mitigating software faults can invariably be a combination of hardware and software.

While an anomaly-based computational geometry technique for detecting, diagnosing, and/or mitigating software faults has been described in connection with the various embodiments of the various figures, it is to be understood that other similar embodiments can be used or modifications and additions can be made to the described embodiments for an anomaly-based computational geometry technique for detecting, diagnosing, and/or mitigating software faults without deviating therefrom. Therefore, an anomaly-based computational geometry technique for detecting, diagnosing, and/or mitigating software faults should not be limited to any single embodiment, but rather should be construed in breadth and scope in accordance with the appended claims.

What is claimed:

1. A method for detecting a software fault, the method comprising:
measuring at least one first runtime metric of software executing on a processor;
constructing, in a operating space, a geometric enclosure based on the at least one measured first runtime metric;
measuring at least one second runtime metric of the software;
placing the at least one second runtime metric in the operating space;
determining that the software is in normal operating state when the at least one second runtime metric is located within or on a perimeter of the geometric enclosure; and
determining that the software is in an abnormal operating state when the at least one second runtime metric is located outside of the geometric enclosure.

2. The method of claim 1, wherein the geometric enclosure is at least one of a convex hull, a sphere, or an ellipsoid.

3. The method of claim 1, wherein:
the operating space is a Euclidean space comprising N dimensions; and
N represents a number of first runtime metrics.

4. The method of claim 1, further comprising, when it is determined that the software is in an abnormal operating state, taking action to mitigate or alleviate the abnormal operating state based upon where the at least one second runtime metric lies in the operating space.

5. The method of claim 4, wherein an action to mitigate or alleviate comprises at least one of shutting down a service, disabling a service's feature, restarting a service, disabling a service's disk access, disabling a service's network access through a socket, or disabling a service's access to a database.

6. The method of claim 1, wherein:
a passive sensor is utilized to measure the at least one first and second runtime metrics;
the passive sensor executes as a separate process on the processor;
an active sensor is utilized to measure the at least one first and second runtime metrics;

the active sensor comprises a custom function that is incorporated into source code of the software.

7. The method of claim 1, further comprising constructing, in the operating space and outside of the perimeter of the geometric enclosure, at least one other geometric enclosure for further determining a state of the software.

8. A processor configured to:
measure at least one first runtime metric of software executing on the processor;
construct, in a operating space, a geometric enclosure based on the at least one measured first runtime metric;
measure at least one second runtime metric of the software;
place the at least one second runtime metric in the operating space;
determine that the software is in normal operating state when the at least one second runtime metric is located within or on a perimeter of the geometric enclosure; and
determine that the software is in an abnormal operating state when the at least one second runtime metric is located outside of the geometric enclosure.

9. The processor of claim 8, wherein the geometric enclosure is at least one of a convex hull, a sphere, or an ellipsoid.

10. The processor of claim 8 wherein:
the operating space is a Euclidean space comprising N dimensions; and
N represents a number of first runtime metrics.

11. The processor of claim 8, wherein, when it is determined that the software is in an abnormal operating state, the processor takes action to mitigate or alleviate the abnormal operating state based upon where the at least one second runtime metric lies in the operating space.

12. The processor of claim 11, wherein an action to mitigate or alleviate comprises at least one of shutting down a service, disabling a service's feature, restarting a service, disabling a service's disk access, disabling a service's network access through a socket, or disabling a service's access to a database.

13. The processor of claim 8, wherein:
a passive sensor is utilized to measure the at least one first and second runtime metrics;
the passive sensor executes as a separate process on the processor;
an active sensor is utilized to measure the at least one first and second runtime metrics;
the active sensor comprises a custom function that is incorporated into source code of the software.

14. The processor of claim 8, further configured to construct, in the operating space and outside of the perimeter of the geometric enclosure, at least one other geometric enclosure for further determining a state of the software.

15. A computer-readable storage medium that is not a propagating signal, the computer-readable storage medium comprising executable instruction for detecting a software fault, the executable instructions, when executed by a processor, cause the processor to effectuate operations comprising:
measuring at least one first runtime metric of software executing on a processor;
constructing, in a operating space, a geometric enclosure based on the at least one measured first runtime metric;
measuring at least one second runtime metric of the software;
placing the at least one second runtime metric in the operating space;
determining that the software is in normal operating state when the at least one second runtime metric is located within or on a perimeter of the geometric enclosure; and
determining that the software is in an abnormal operating state when the at least one second runtime metric is located outside of the geometric enclosure.

16. The computer-readable storage medium of claim 15, wherein the geometric enclosure is at least one of a convex hull, a sphere, or an ellipsoid.

17. The computer-readable storage medium of claim 15, wherein:
the operating space is a Euclidean space comprising N dimensions; and
N represents a number of first runtime metrics.

18. The computer-readable storage medium of claim 15, wherein, when it is determined that the software is in an abnormal operating state, the instructions further take action to mitigate or alleviate the abnormal operating state based upon where the at least one second runtime metric lies in the operating space.

19. The computer-readable storage medium of claim 15, wherein the instructions, when executed by the computer, further construct, in the operating space and outside of the perimeter of the geometric enclosure, at least one other geometric enclosure for further determining a state of the software.

20. The computer-readable storage medium of claim 15, wherein:
a passive sensor is utilized to measure the at least one first and second runtime metrics;
the passive sensor executes as a separate process on the processor;
an active sensor is utilized to measure the at least one first and second runtime metrics;
the active sensor comprises a custom function that is incorporated into source code of the software.

* * * * *